United States Patent
Peterson et al.

(10) Patent No.: US 11,200,532 B2
(45) Date of Patent: Dec. 14, 2021

(54) DELIVERY ROBOT AND METHOD OF OPERATION

(71) Applicant: Caterpillar Inc., Peoria, IL (US)

(72) Inventors: Kevin Peterson, San Francisco, CA (US); Matthew Delaney, San Francisco, CA (US); Zac Witte, San Francisco, CA (US); Jason Calaiaro, San Francisco, CA (US); Jon Anderson, San Francisco, CA (US); Zachery Shivers, San Francisco, CA (US)

(73) Assignee: Caterpillar Inc., Peoria, IL (US)

( * ) Notice: Subject to any disclaimer, the term of this patent is extended or adjusted under 35 U.S.C. 154(b) by 689 days.

(21) Appl. No.: 15/951,791

(22) Filed: Apr. 12, 2018

(65) Prior Publication Data

US 2018/0300676 A1    Oct. 18, 2018

Related U.S. Application Data

(60) Provisional application No. 62/484,511, filed on Apr. 12, 2017.

(51) Int. Cl.
| | | |
|---|---|---|
| *G06Q 10/08* | (2012.01) | |
| *G05D 1/02* | (2020.01) | |
| *B60Q 1/50* | (2006.01) | |
| *G07C 9/00* | (2020.01) | |

(52) U.S. Cl.
CPC .......... *G06Q 10/0832* (2013.01); *B60Q 1/50* (2013.01); *G05D 1/0212* (2013.01); *G05D 1/0246* (2013.01); *G05D 1/0278* (2013.01); *G07C 9/00896* (2013.01); *G07C 2009/0092* (2013.01)

(58) Field of Classification Search
CPC .... G06Q 10/0832; B60Q 1/50; G05D 1/0212; G05D 1/0246; G05D 1/0278; G07C 9/00896; G07C 2009/0092
USPC ........................................................ 705/332
See application file for complete search history.

(56) References Cited

U.S. PATENT DOCUMENTS

| | | | |
|---|---|---|---|
| 9,256,852 B1 | 2/2016 | Myllymaki | |
| 9,373,149 B2 | 6/2016 | Abhyanker | |
| 9,489,490 B1 * | 11/2016 | Theobald | ................. B25J 5/007 |
| 9,741,010 B1 | 8/2017 | Heinla | |
| 2013/0261792 A1 | 10/2013 | Gupta et al. | |

(Continued)

FOREIGN PATENT DOCUMENTS

CN       209807958 U  * 12/2019

OTHER PUBLICATIONS

Use of pharmacy delivery robots in intensive care units By American Journal of Health-System Pharmacy (Year: 2011).*

(Continued)

*Primary Examiner* — Zeina Elchanti
(74) *Attorney, Agent, or Firm* — Xsensus LLC

(57) ABSTRACT

A method of delivery robot operation, preferably including: navigating the robot to a location of a user; authenticating the user; initiating a transaction with the user; determining a user interaction with a compartment of the robot; and determining a termination event. A delivery robot, preferably including: a compartment, preferably including a door and defining a lumen; a cargo sensor; a communications module; one or more outputs: one or more inputs; a control module; and a drive module.

20 Claims, 12 Drawing Sheets

(56) References Cited

U.S. PATENT DOCUMENTS

| | | | |
|---|---|---|---|
| 2014/0330603 A1* | 11/2014 | Corder | G05B 15/02 |
| | | | 705/7.12 |
| 2015/0006005 A1 | 1/2015 | Yu et al. | |
| 2015/0120094 A1 | 4/2015 | Kimchi et al. | |
| 2015/0227882 A1 | 8/2015 | Bhatt | |
| 2016/0259341 A1 | 9/2016 | High et al. | |
| 2016/0300187 A1* | 10/2016 | Kashi | G06Q 10/0836 |
| 2017/0161984 A1* | 6/2017 | Nishimura | G07F 17/12 |
| 2018/0024554 A1 | 1/2018 | Brady et al. | |
| 2018/0060800 A1* | 3/2018 | Robinson | G07C 9/00571 |
| 2018/0205682 A1* | 7/2018 | O'Brien | H04L 51/10 |
| 2018/0232839 A1* | 8/2018 | Heinla | G05D 1/0027 |
| 2018/0246526 A1* | 8/2018 | Wilkinson | G05D 1/0291 |
| 2019/0287051 A1* | 9/2019 | Heinla | G06Q 10/083 |

OTHER PUBLICATIONS

Vehicle Routing Problems for Drone Delivery Published by IEEE in 2016 (Year: 2016).*

* cited by examiner

DELIVERY ROBOT AND METHOD OF OPERATION

CROSS-REFERENCE TO RELATED APPLICATIONS

This application claims the benefit of U.S. Provisional Application Ser. No. 62/484,511, filed on 12 Apr. 2017, which is incorporated in its entirety by this reference.

TECHNICAL FIELD

This invention relates generally to the robotics field, and more specifically to a new and useful delivery robot and method of operation in the robotics field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method Overview

Figure 1:
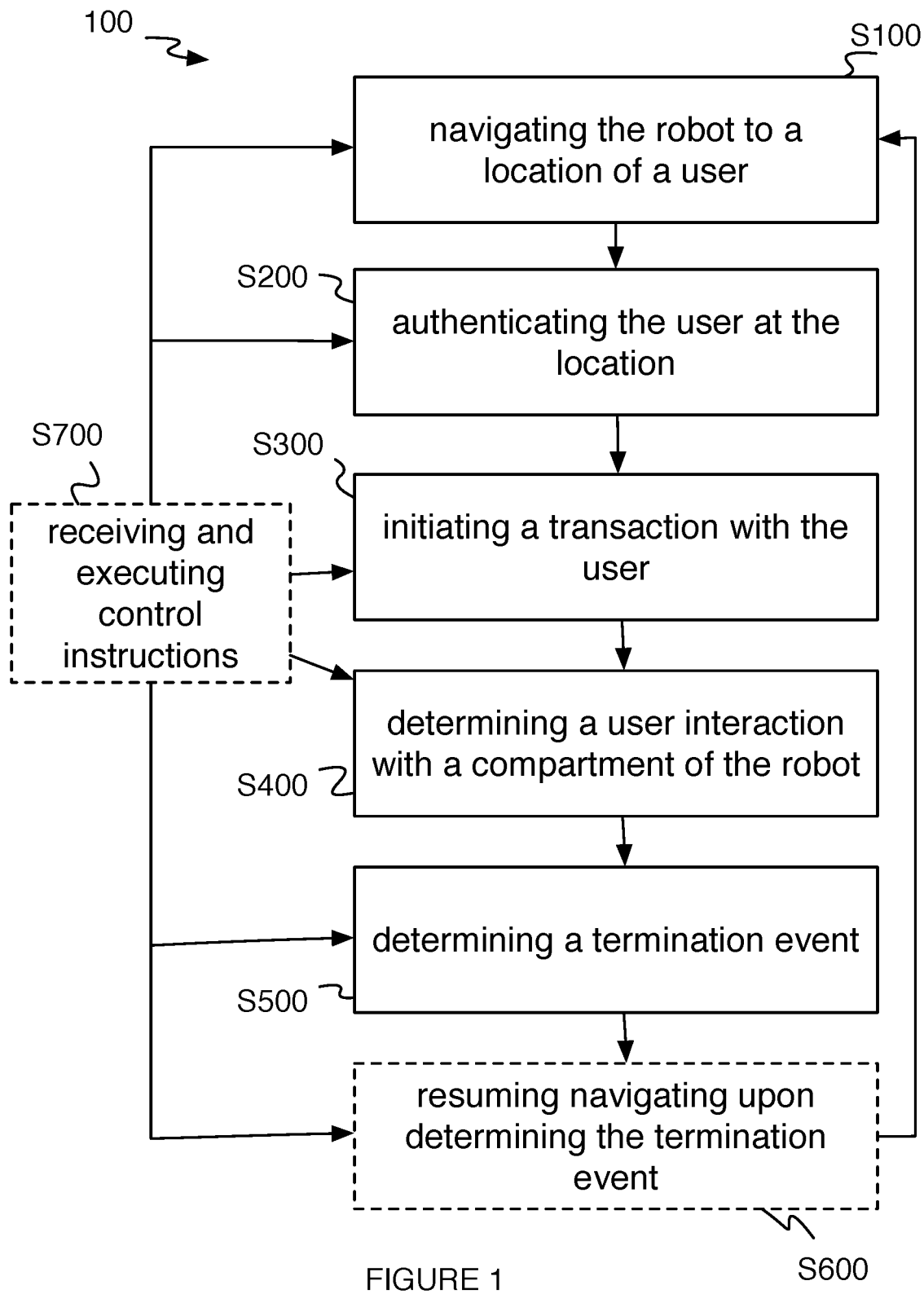
FIG. 1 is a schematic representation of a variation of the method.

As shown in FIG. 1, a method 100 preferably includes: navigating the robot to a location of a user S100; authenticating the user at the location S200; initiating a transaction with the user S300; determining a user interaction with a compartment of the robot S400; and determining a termination event S500. The method 100 can additionally or alternatively include resuming navigation upon determining a termination event Shoo and/or receiving and executing instructions S700.

The method preferably functions to deliver goods (e.g., cargo) to one or more users. The method can additionally function to receive goods from one or more users for subsequent delivery. The method can additionally function to communicate the status and/or intent of the robot to a user during a delivery process.

In variations, a delivery process can include receiving goods, transporting goods, providing goods, or any other suitable action relating to the physical transfer of goods from one location to another (e.g., from a grocery store to the home of a user). In variations, a user can include a recipient of goods (e.g., the person receiving a delivery), the provider of goods (e.g., a store clerk providing goods to the robot for delivery), a bystander or pedestrian (e.g., an individual interacting with the robot as it traverses a sidewalk), a teleoperator of the robot (e.g., a fleet manager remotely operating the robot), any combination of the aforementioned (e.g., a user can provide goods to the robot at a store location, and the same user can receive those goods from the robot at a residential location at a later time), or any other suitable entity that can interact with the robot.

2. Benefits

Variants of the method 100 can confer several benefits and/or advantages. First, variants of the method 100 can build trust between a user (e.g., a recipient and/or deliverer) and the delivery robot. For example, the robot can intuitively communicate to the user that it contains the user's goods by displaying a light pattern corresponding to a similar light pattern displayed on a mobile device of the user. Such communication can be particularly beneficial in cases where multiple robots, each containing various entities' goods, are navigating pedestrian byways proximal the user. In another example, the robot can indicate its intentions to the user prior to taking an action that may perturb the user, such as displaying a light pattern indicative that the robot is preparing to leave without departing or otherwise commencing navigation. In variations, the robot communicates to the user that the experience (e.g., delivery process) is complete or nearing completion, in order to prepare the user for the robot's actions and avoid miscommunications or differential expectations between the robot and the user.

Second, variants of the method 100 can communicate robot states and/or intent to the user, as well as receive and interpret the states and/or intent of the user, to provide a pleasant and efficient experience to the user. For example, the robot can, through various outputs (e.g., speakers, light emitters, displays), communicate (e.g., in words, in expressive actions, in tones, in text messages transmitted to a user's mobile device, in expressive displays, graphics and tones displayed at an application executing on a user's mobile device, etc.) that the robot is en route to a user's location, that the robot contains goods destined for the user, a compliment to the user, an admonishment to the user, that the user has added and/or removed the correct item (e.g., an item belonging to the user), that the user has added and/or removed an incorrect item (e.g., an item not belonging to the user), and that the transaction (e.g., goods removal and/or addition) has concluded and that the robot is ready to depart. However, the robot can otherwise suitably communicate any suitable state or intention.

Figure 10A:
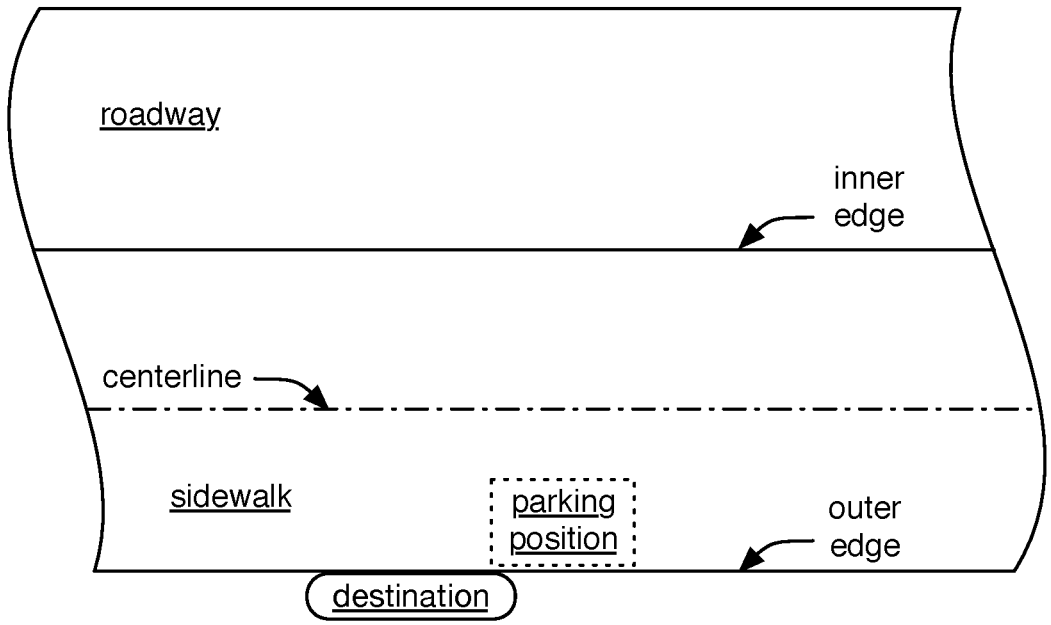
FIGS. 10A-10B are depictions of specific examples of determining a parking position on a sidewalk.
Figure 10B:
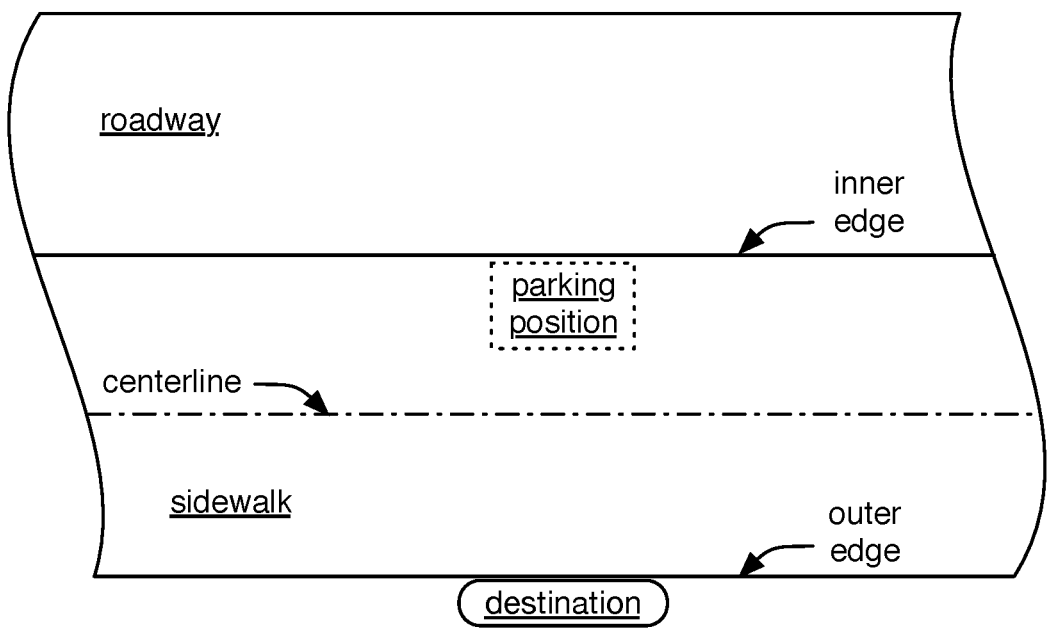
Figure 11A:
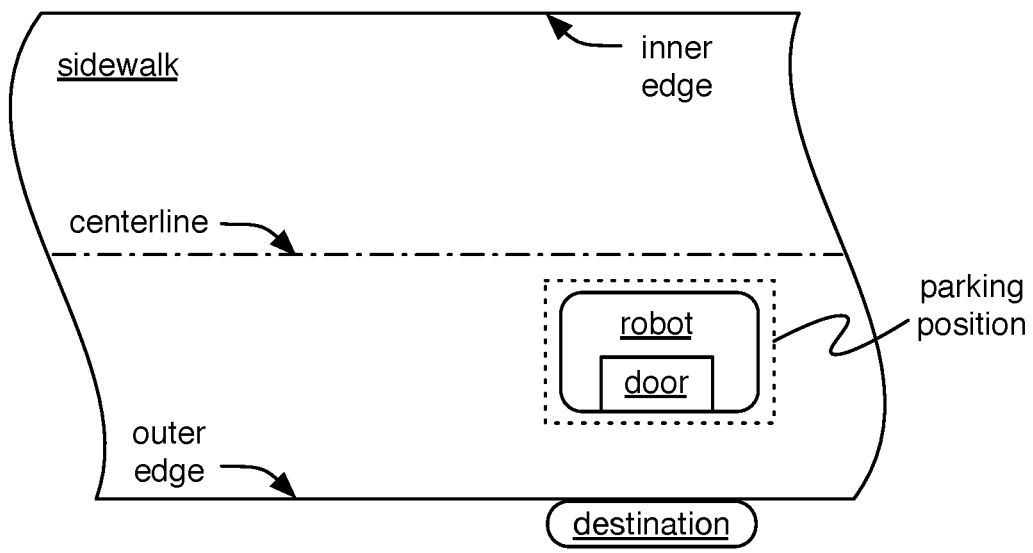
FIGS. 11A-11D are depictions of specific examples of the robot parked on a sidewalk.

Third, variants of the method 100 can enable the delivery robot to address navigational hazards endemic to pedestrian byways (e.g., sidewalks, crosswalks, office buildings, etc.) while also suitably interacting with entities (e.g., users). For example, upon arriving at a destination location (e.g., a user's residence), the robot can arrange itself on a sidewalk at a position distal the nearest vehicular roadway (e.g., as shown in FIGS. 10, 11A, and/or 11B), such as distal a sidewalk centerline relative to the roadway. The robot can optionally further arrange itself such that its compartment opens at the side of the robot distal the roadway while permitting sufficient space for a user to access the compartment while stationed on the sidewalk. Thus, in this example, the robot shields the user from vehicular traffic along the roadway and shields the compartment from passersby traversing the sidewalk. Alternatively, the robot arranges itself such that the compartment opens along the robot side proximal the sidewalk center, which gives a user sufficient space to stand and interact with the compartment interior. In related examples, the robot can navigate along sidewalks according to a right-hand right-of-way driving pattern, utilizing real-time analysis to selectively ignore the driving pattern (e.g., to navigate forward along the left-hand side of the sidewalk to avoid construction, an entity lying in the sidewalk, etc.).

Fourth, variants of the method 100 can enable remote management of a group (e.g., fleet) of delivery robots. For example, while performing delivery processes, the robot can update a remote server with the robot's status (e.g., logging that a delivery has been completed), receive additional instructions (e.g., determine the next delivery and destination location), and dynamically execute the additional instructions (e.g., navigate to a new location utilizing a GPS and autonomous locomotion techniques). In a related example, the robot can receive a notification indicating that a delivery has been canceled, and return to the original location (e.g., a grocery store) from which the goods to be delivered were obtained.

However, variants of the method 100 can confer any suitable benefits and/or advantages.

3. Related Systems

Portions of the method 100 can, in variations, be implemented using and/or performed by a delivery robot. As shown in FIGS. 2A-D, 3, 4, 5A-D, and 6A-B, the delivery robot preferably includes: a compartment including a door and defining a lumen, a cargo sensor, a communications module, one or more outputs, one or more inputs, a control module, and a drive module. In variations, the inputs include a set of external sensors including imaging sensors (e.g., cameras) and rangefinding sensors. The delivery robot preferably functions to receive cargo at a first location, transport the cargo to a second location, and provide the cargo to an entity (e.g., a user) at the second location, and can additionally or alternatively function to transport cargo to multiple locations associated with multiple entities, receive cargo from multiple locations, provide cargo to an entity at multiple locations (e.g., sequentially), or perform any other suitable delivery functionality or delivery process. The delivery robot can function to interact with a first user, including to receive goods into the compartment from the first user, transport the goods, and to interact with a second user, including to provide the goods to a second user; in some variations, the first and second user can be the same user. However, the delivery robot can have any other suitable functionality.

Figure 6A:
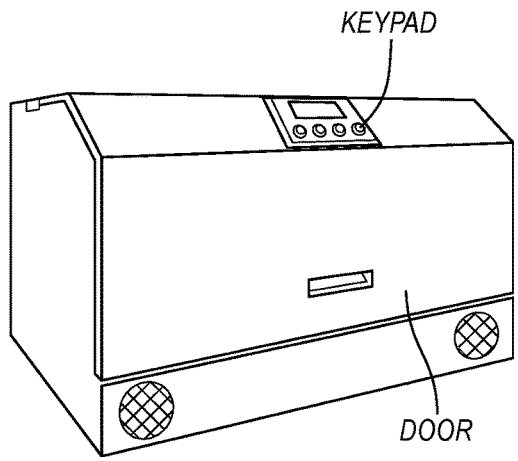
FIGS. 6A-B are depictions of the compartment of a variation of the robot.
Figure 6B:
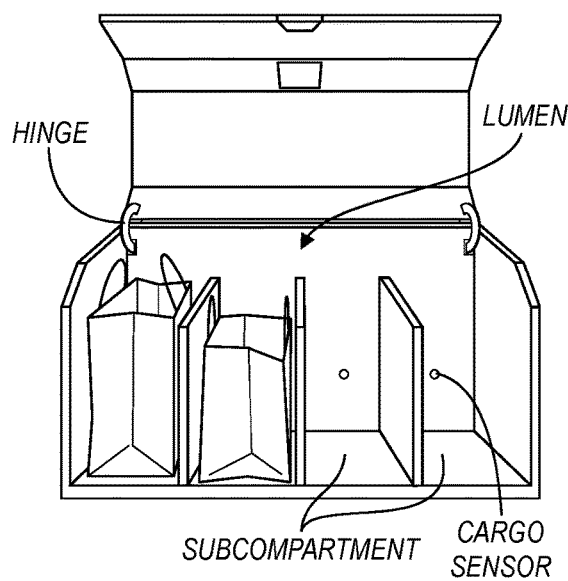

The compartment of the delivery robot functions to securely retain the goods of one or more users during transport. The compartment is preferably a rectangular prismatic compartment, but can be any other suitable shape. The compartment defines a lumen, which is preferably divided into subcompartments (e.g., as shown in FIG. 6B), but can alternatively be contiguous or otherwise suitably partitioned or not partitioned.

The compartment preferably includes a door, more preferably a locking door (e.g., powered lock, such as a lock that can be automatically controlled to enable and/or prevent access to the compartment interior), but alternatively any suitable door or no door. As shown in FIG. 6B, the door of the compartment is preferably a hatch that has one or more hinges, proximal a first side of the robot, arranged at the top surface of the compartment (e.g., rotationally coupled to the robot about a substantially horizontal hinge axis, such as an axis proximal the top surface). The door of the compartment preferably remains close to the rest of the robot during opening and/or while open. For example, the maximum opening extent of the hatch can be limited (e.g., to a threshold angle, such as 90°), which can limit extension of the hatch past the second side of the robot (opposing the first side), preferably preventing the hatch from extending outside the closed-door footprint of the robot. However, the door can be otherwise suitably configured and can articulate in any other suitable manner (e.g., a sliding door that translates along a track; a hinged door with one or more hinges otherwise arranged on the robot, such as near a bottom or side of the door; multiple doors, such as double doors in a French window configuration; etc.). The compartment opening preferably encompasses the majority of a first and second side of the compartment, but can alternatively encompass a single robot side or be otherwise configured. In one example, the compartment opening encompasses the entirety of a first compartment side (e.g., the compartment top) and the majority of a second compartment side contiguous with the first compartment side.

The compartment can optionally include a set of one or more light sources (e.g., light emitters such as LEDs, lightbulbs, etc.; light pipes; mirrors; etc.). For example, each light source of the set can be oriented toward (e.g., directed at) a particular subcompartment (e.g., configured to illuminate the subcompartment and/or the goods within it), such as with one or more light sources directed at each subcompartment of the compartment. However, a light source can be directed toward multiple subcompartments or any suitable number of subcompartments The compartment can optionally include structures configured to support and/or retain goods. For example, the compartment can include one or more trays, such as hinged trays that can be stowed against a compartment wall and/or fold out (e.g., into a substantially horizontal support surface). The compartment can be made of easily washed and/or sterilized materials, such as stainless steel, and/or have any other suitable composition. The compartment can include drain holes (e.g., along an outside edge, an inside edge, etc.), have a floor angled toward the opening, have a collection tray (e.g., between the drivetrain and the compartment, along an edge of the compartment, fluidly sealed from the drivetrain, etc.), be continuous and/or solid (e.g., not have any holes), or include any other suitable fluid management system.

The compartment can optionally include climate control mechanisms (e.g., temperature and/or humidity control). In one example, the robot includes a heat transmission module (e.g., one or more ducts, optionally including one or more controllable fans and/or valves) that transmits heat from other modules of the robot (e.g., waste heat from robot processors, powertrain, and/or batteries). In this example, the heat transmission module can be controlled to provide heat to the compartment when desired (e.g., when the compartment contains hot food) and/or controlled to cease or reduce heat provision, can provide heat at all times, can be controllable in any other suitable manner, and/or can be uncontrolled. In another example, the robot includes a heating and/or cooling mechanism, such as a resistive heater, a peltier pump, or any other suitable heating and/or cooling mechanism. However, the climate control mechanism can include humidifiers, dehydrators, smokers, and/or any other suitable climate control mechanism. The climate control mechanism can be connected to the compartment (or subcompartment) surfaces, such as the walls or floor; be thermally connected to the compartment (or subcompartment) lumen (e.g., include a vent fluidly connected to the compartment interior); or be otherwise thermally or fluidly connected to the compartment. However, the compartment can additionally or alternatively include any other suitable elements.

The cargo sensor of the delivery robot functions to monitor the lumen of the compartment. The delivery robot preferably includes one cargo sensor for each subcompartment of the compartment, but can alternatively include a single cargo sensor for the entire compartment (e.g., a single camera that can simultaneously view the entire lumen) or any other suitable number of cargo sensors corresponding to the number of subcompartments with any suitable correspondence. The cargo sensor preferably has a binary output (e.g., the output indicates that an item is in the subcompartment or is not in the subcompartment) but can alternatively have a non-binary output (e.g., image data, weight data, etc.). In variations, the output of the cargo sensor can be processed to generate a binary output (e.g., image data can be analyzed to determine the presence or lack of presence of goods in a subcompartment, weight data can be compared to a threshold weight to determine whether specific goods of a known weight are in a subcompartment, etc.). The cargo sensor (e.g., compartment occupancy sensor) preferably includes a time-of-flight (ToF) sensor (e.g., optical, sonar, radar, etc.) defining a detection axis arranged to intersect any goods present in a subcompartment of the compartment (e.g., parallel a subcompartment lateral or longitudinal axis) and provide a binary output indicative of the presence (or non-presence) of goods, but can additionally or alternatively include a weight sensor, an RFID reader, an imaging system or any other suitable sensor(s) that can be used to determine the presence and/or identity of goods contained within the compartment and/or subcompartments of the robot. In one example, the sensor is mounted to the compartment wall and directed toward the compartment opening (e.g., wherein the sensor detection axis can intersect the compartment opening or be offset from the compartment opening). In a second example, the sensor is mounted in the compartment floor and is directed upward. However, the sensor can be otherwise configured. The cargo sensor can, in variations, include multiple sensors and/or sensor types corresponding to each subcompartment (e.g., a camera viewing the entire compartment interior and a weight sensor corresponding to each subcompartment); however, the cargo sensor can include any suitable sensors, sensor types, and/or number of sensors with any suitable correspondence to the compartment or subcompartments.

The communication module of the robot functions to enable data transfer between the robot and various entities over a wireless data transfer network. For example, the communication module can be used to enable a teleoperator to pilot (e.g., teleoperate, navigate) the robot from a first location to a second location. In another example, the communication module can be used to upload and download data from a database. In another example, the communication module can be used to stream data between the robot and a remote computing system in substantially real-time (e.g., with the lowest latency enabled by the wireless network). However, the communication module can be used to perform any suitable communication process. The communication module preferably includes one or more radios (e.g., cellular radios, Wi-Fi radios), antennas, but can additionally or alternatively include any other suitable components that can be used for wireless communication.

Figure 2A:
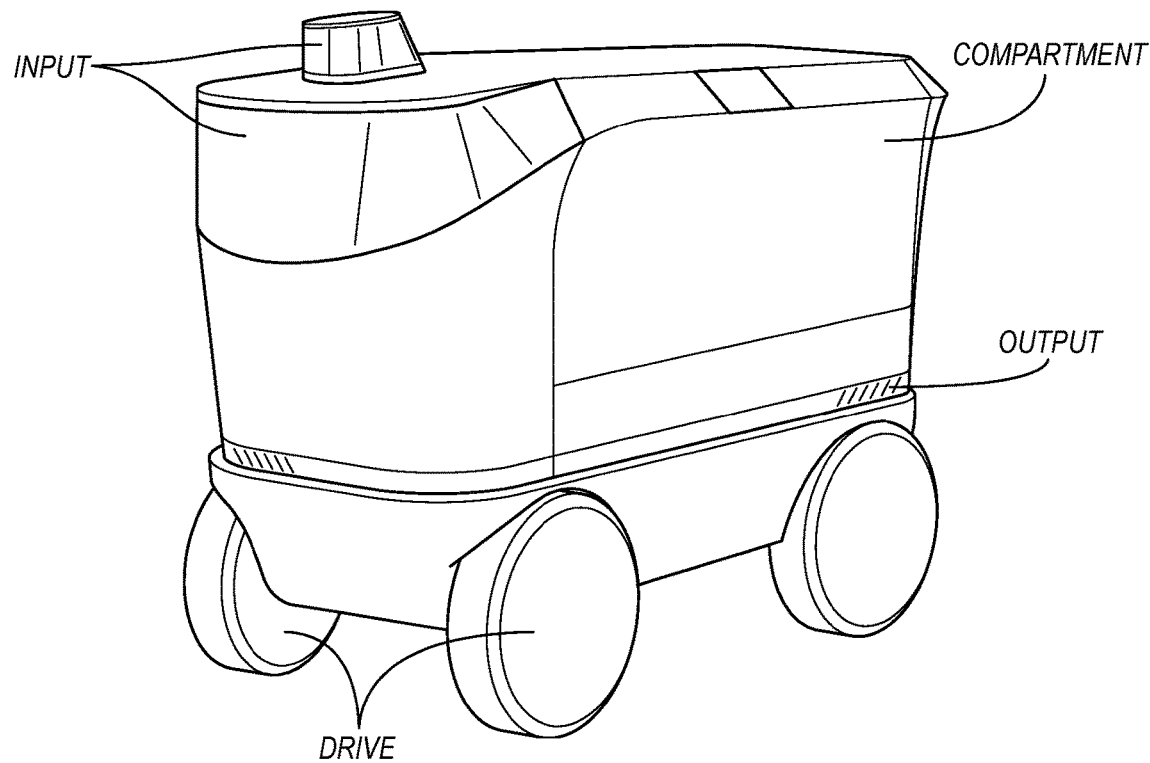
FIGS. 2A-D are perspective views of variations of the robot.
Figure 2B:
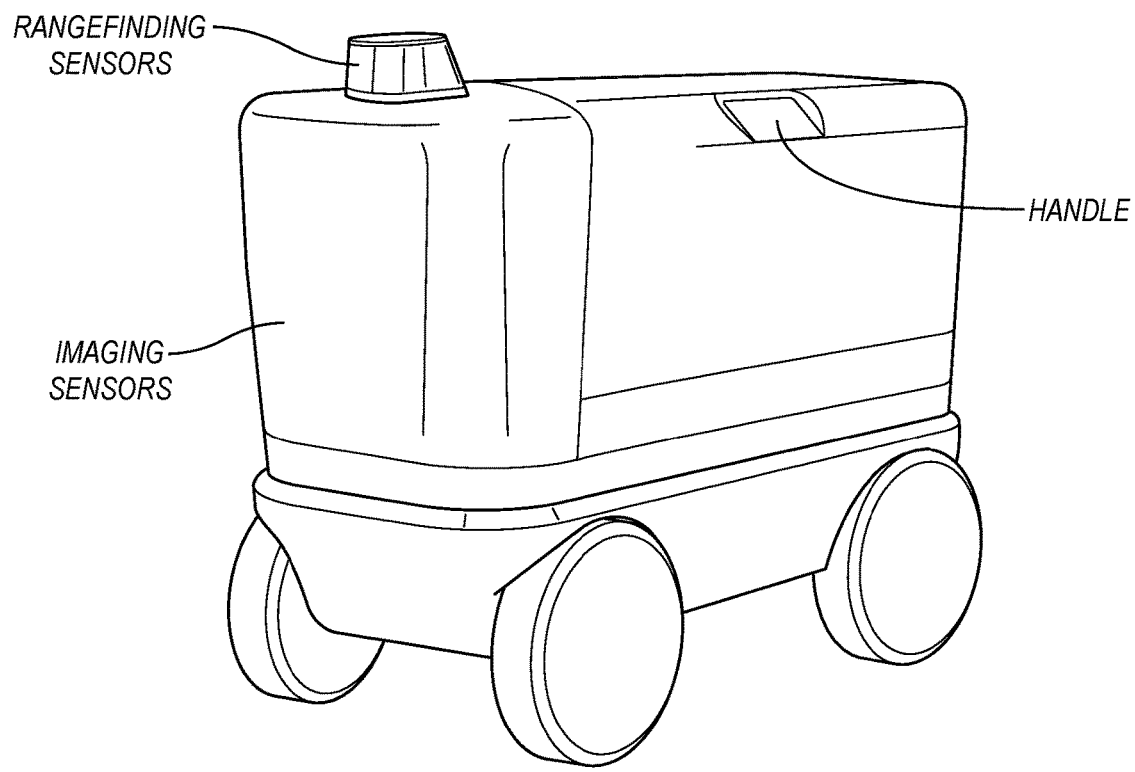
Figure 2C:
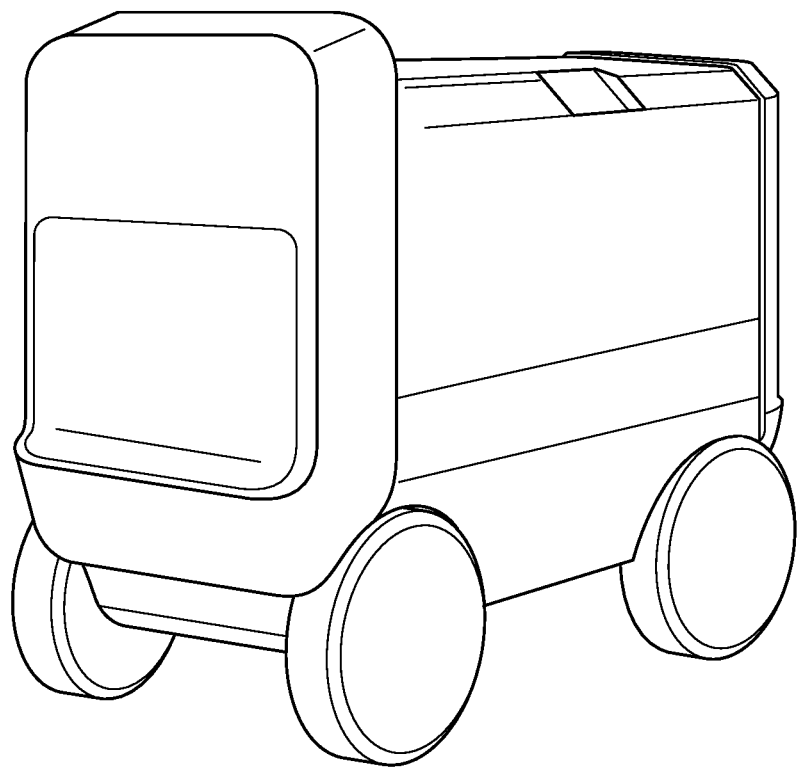
Figure 2D:
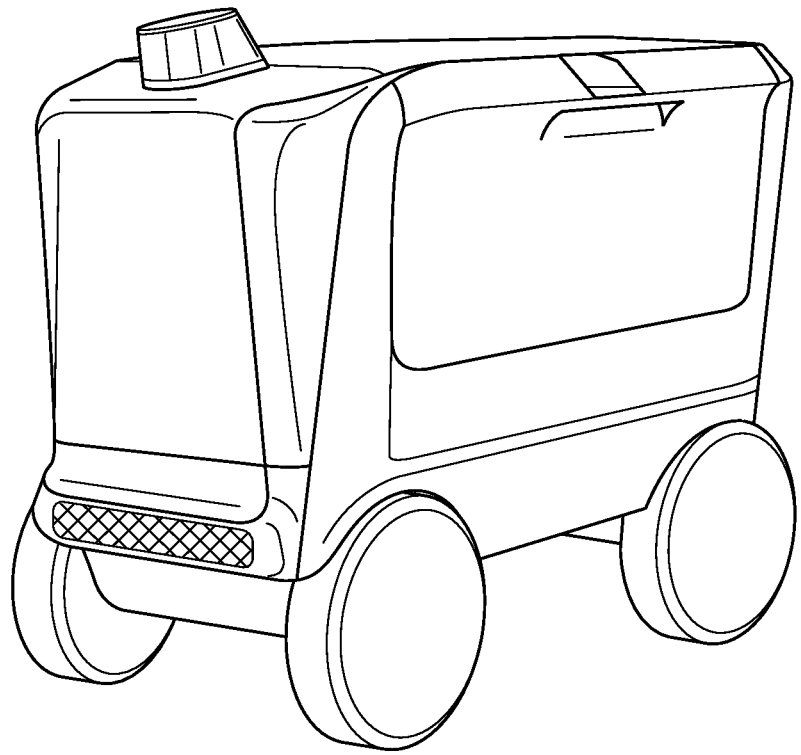
Figure 3:
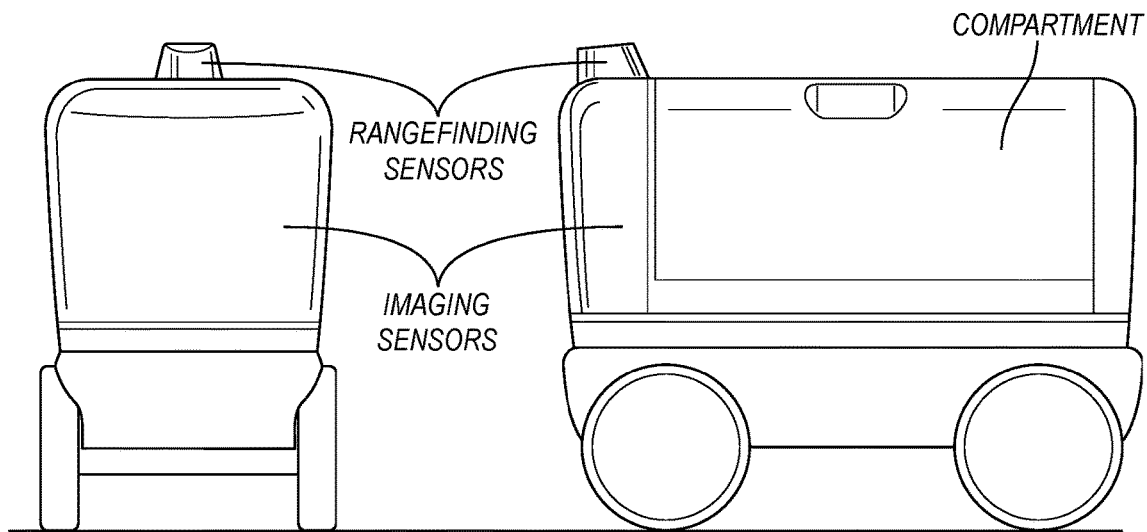
FIG. 3 is a front and side view of a variation of the robot.
Figure 4:
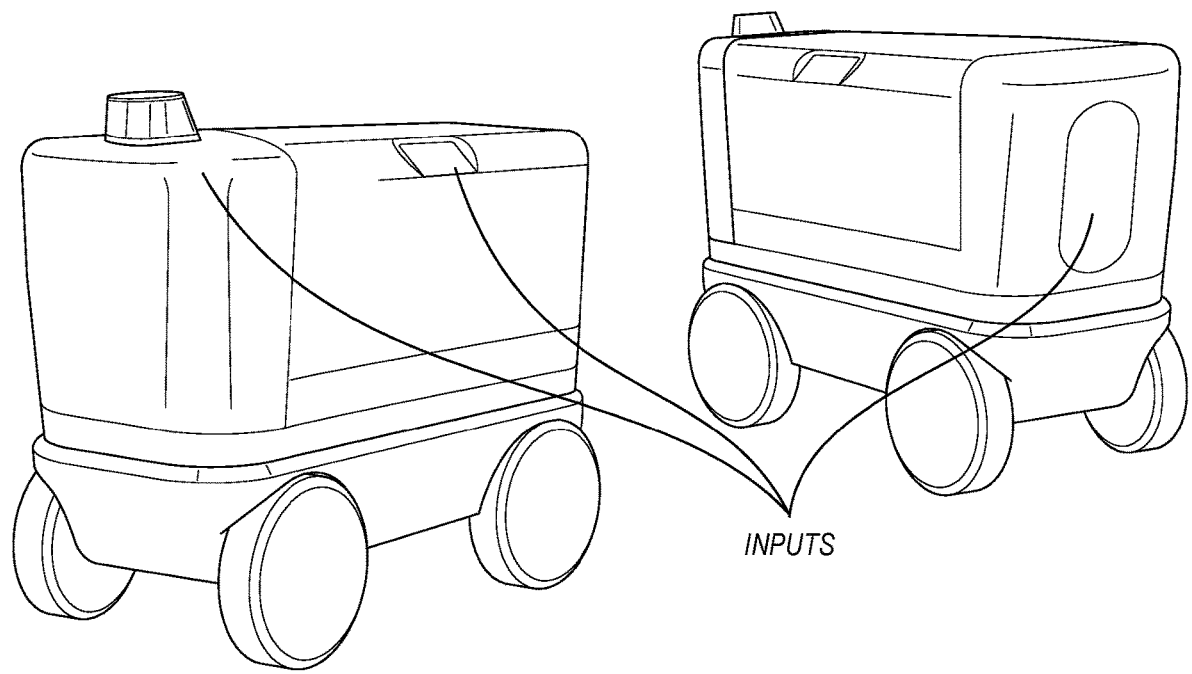
FIG. 4 is a front and rear three-quarter view of a variation of the robot.
Figure 5A:
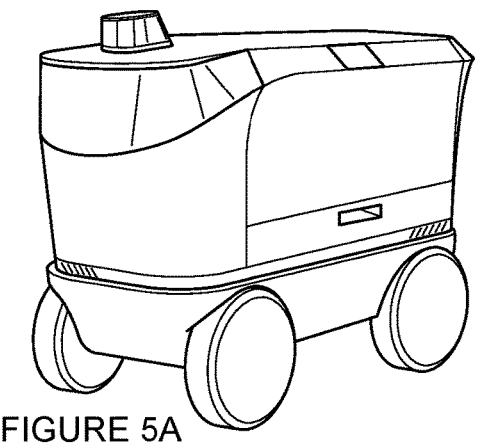
FIGS. 5A-D are front three-quarter views of variations of the robot.
Figure 5B:
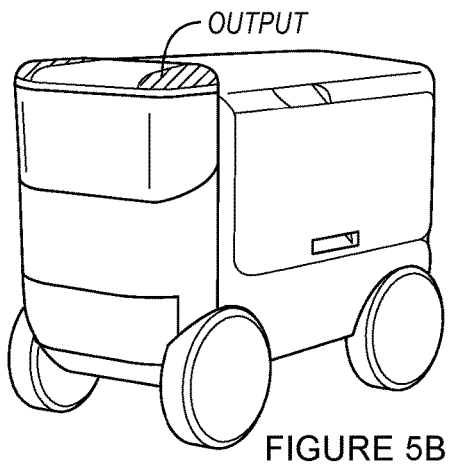
Figure 5C:
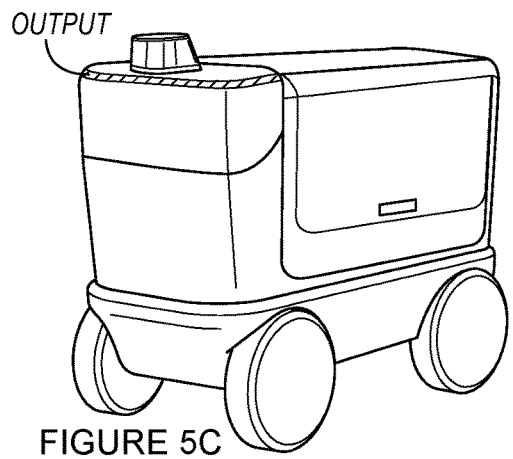
Figure 5D:
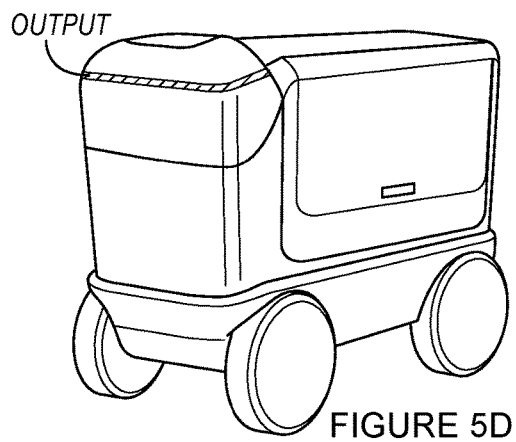

The inputs of the robot function to collect information from the surroundings of the robot. The inputs can additionally function to enable the robot to interact with a user, and for that user to provide information to the robot at one or more of the inputs (e.g., to authenticate the user, to receive user instructions, etc.). The inputs can include sensors, such as image sensors (e.g., cameras), auditory sensors (e.g., microphones), temperature sensors, humidity sensors, light sensors, pressure (e.g., barometric pressure) sensors, olfactory sensors, force (e.g., touch) sensors, and any other suitable sensors. The inputs can additionally or alternatively include input mechanisms, such as keypads, switches, buttons, touch-sensitive displays, levers, knobs, handles, and any other suitable input mechanisms. The inputs can additionally or alternatively include biometric sensors, such as an iris reader, fingerprint scanner, gait analysis imaging and processing systems, voice recognition sensors and processing systems, a DNA analysis system, and any other suitable biometric sensors. The inputs can be positioned at the robot in any suitable location. For example, the robot can include imaging and rangefinding sensors housed in a head module of the robot, as shown in FIG. 2B, and a keypad arranged along a top edge of the compartment of the robot.

The outputs of the robot function to communicate the state and/or intentions of the robot to its surroundings. The outputs can include audio outputs (e.g., speakers), visual outputs (e.g., screens, displays, lighting modules), touch outputs (e.g., haptic actuators), and any other suitable output mechanisms. The outputs can be arranged on the robot in any suitable locations or positions. In a first variation (e.g., as shown in FIG. 2A), the outputs include a strip of controllable lighting arranged about the circumference of the robot proximal the base, that can be controlled to emit light with any suitable pattern (e.g., spatial pattern, temporal pattern) and of any suitable color. In a second variation, the outputs include one or more light projectors that can project light (e.g., patterned light) onto the ground surrounding the robot (e.g., projecting an indication of the robot's planned path during navigation, such as a light beam or arrow oriented substantially in the planned direction of travel). However, the robot can include any other suitable outputs operated in any other suitable manner.

Operation of the delivery robot can include: navigating along a pedestrian walkway to a location associated with an entity, authenticating the entity, initiating an interaction with the entity in response to authenticating the entity, determining the entity interaction with the compartment of the delivery robot, determining a termination event, and resuming navigating upon determination of the termination event. However, operation of the delivery robot can include any other suitable actions and/or processes.

Portions of the method 100 can, in variations, be implemented using and/or performed by a database. The database functions to store information relating robot contents (e.g., goods, cargo) with users for whom the contents are designated (e.g., by whom they are owned, for whom they are purchased, etc.). In variations, a portion or the entirety of the database can be stored at a remote server (e.g., an internet-connected cloud-based database), at the robot (e.g., in an onboard computation and storage module), and/or at a user device (e.g., a mobile device of the user, a desktop or laptop computer of the user, etc.).

4.1 Block S100

The method preferably includes Block S100, which recites: navigating the robot to a location of a user. Block S100 functions to bring compartment contents (e.g., goods, cargo) to the user. Block S100 can additionally or alternatively function to bring the robot to a location of the user in order to receive contents (e.g., go to a supplier location to receive goods for a user, for subsequent delivery to the user at a location associated with the user; go to a grocery store after delivery to a first user to receive goods from a second user, for subsequent delivery to the second user at the residence of the second user). In a first variation, Block S100 is performed remotely by a teleoperator located at a teleoperation center, and can include receiving driving instructions at the communication module of the robot and executing the driving instructions at a control module and drive module of the robot. In a second variation, Block S100 is performed entirely at a control module of the robot (e.g., the robot navigates autonomously), which autonomously controls the drive module of the robot. However, Block S100 can additionally or alternatively be performed by a combination of the robot and a teleoperator (e.g., semi-autonomously), or in any other suitable manner by any other suitable entity.

Block S100 can include collecting telemetry data (e.g., position data, velocity data, mapping data, localization data, etc.) to aid in navigation. Telemetry data can be collected at sensors of the robot (e.g., cameras, rangefinders, GPS modules, etc.) or in any other suitable manner by any other suitable components. Block S100 can include determining the robot location S110 and pausing navigation upon arrival at a destination location S120. In some examples, Block S100 includes providing an indication of the path of the robot during navigation (e.g., projecting light onto the ground indicating the current trajectory and/or planned path of the robot; activating a subset of light emitters, encircling the robot, that are proximal or along the planned path, thereby indicating the current trajectory and/or planned path; etc.). However, navigating the robot to a location of a user can additionally or alternatively include any other suitable subprocesses.

Figure 11B:
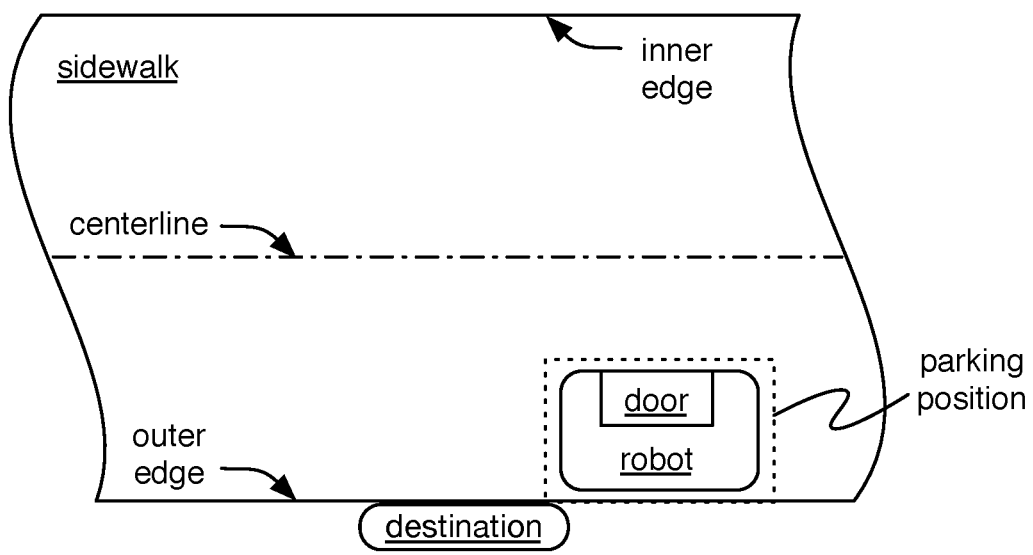
Figure 11C:
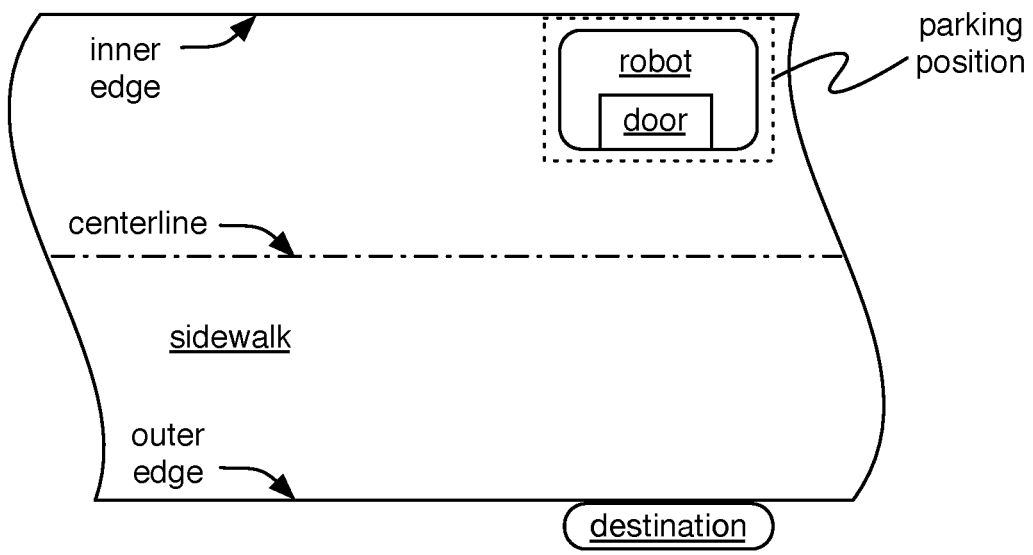
Figure 11D:
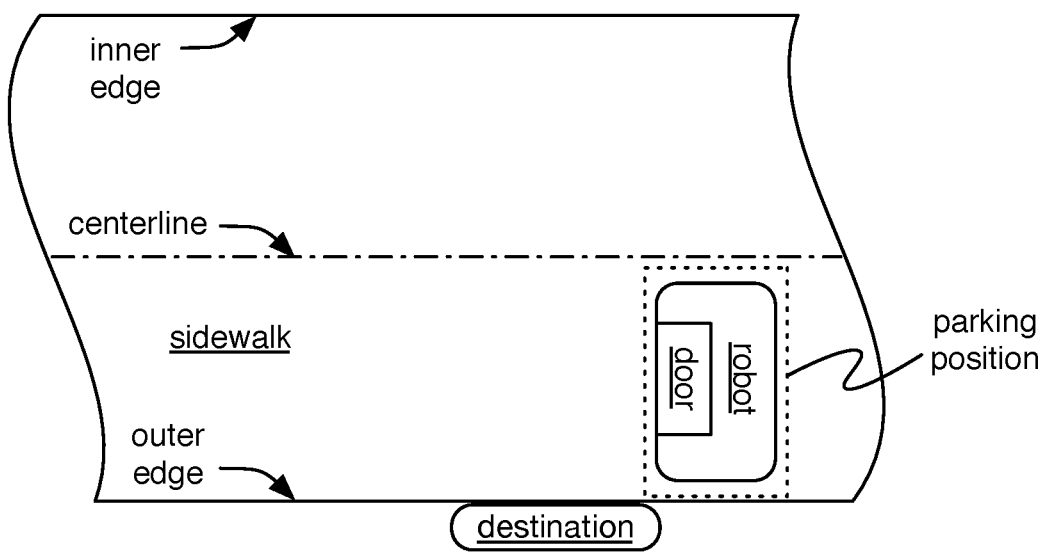
Figure 12:
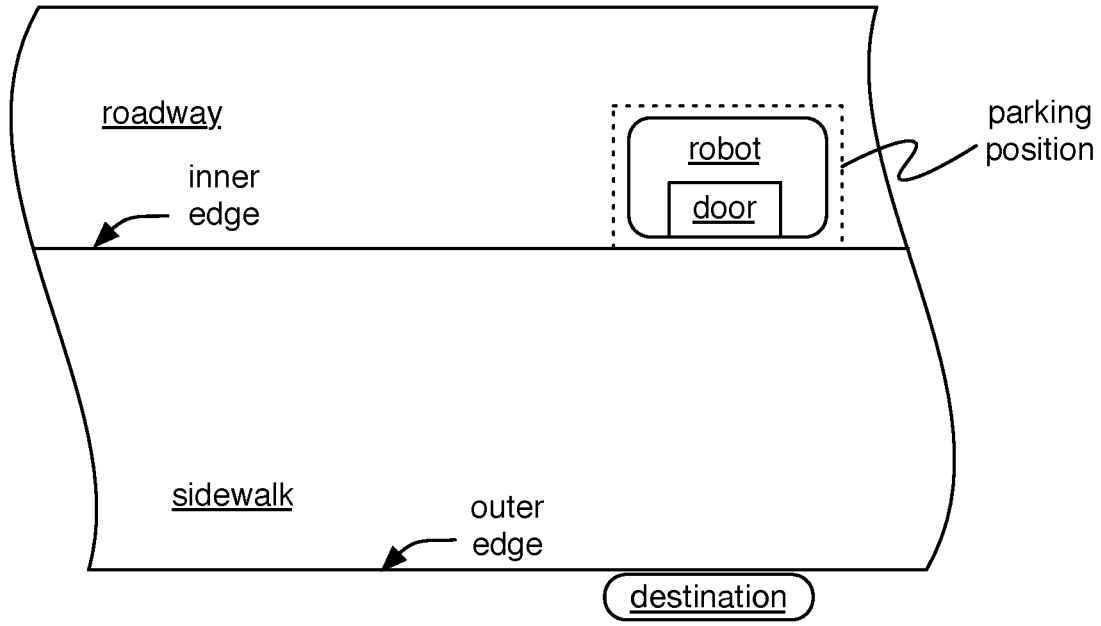
FIG. 12 is a depiction of a specific example of the robot parked on a roadway.

S120 can include determining (e.g., selecting) a parking position within the location at which to pause navigation. The parking position is preferably on the sidewalk, but can additionally or alternatively be in a roadway (e.g., proximal the sidewalk, such as shown in FIG. 12), in a user's driveway or walkway, and/or in any other suitable type of area. The parking position is preferably near the desired destination (e.g., user's position, position of a building entrance associated with the user, etc.). For example, the parking position can be on the sidewalk, distal a nearby roadway (e.g., opposing the roadway across a sidewalk centerline), such as shown in FIG. 10A. In a second example, the parking position can be on the sidewalk, proximal a nearby roadway, such as shown in FIG. 10B. When parked proximal the roadway (e.g., proximal the sidewalk inner edge), the robot is preferably oriented facing the outer edge of the sidewalk (e.g., with the door compartment proximal the outer edge or centerline of the sidewalk), such as shown in FIG. 11C, thereby preferably enabling users to access the compartment while remaining on the sidewalk. In an alternate example, the robot can park facing sideways (e.g., with the door oriented along or at an oblique angle to the sidewalk direction, such as shown in FIG. 11D). However, the robot can park in any other suitable location or orientation.

Figure 13:
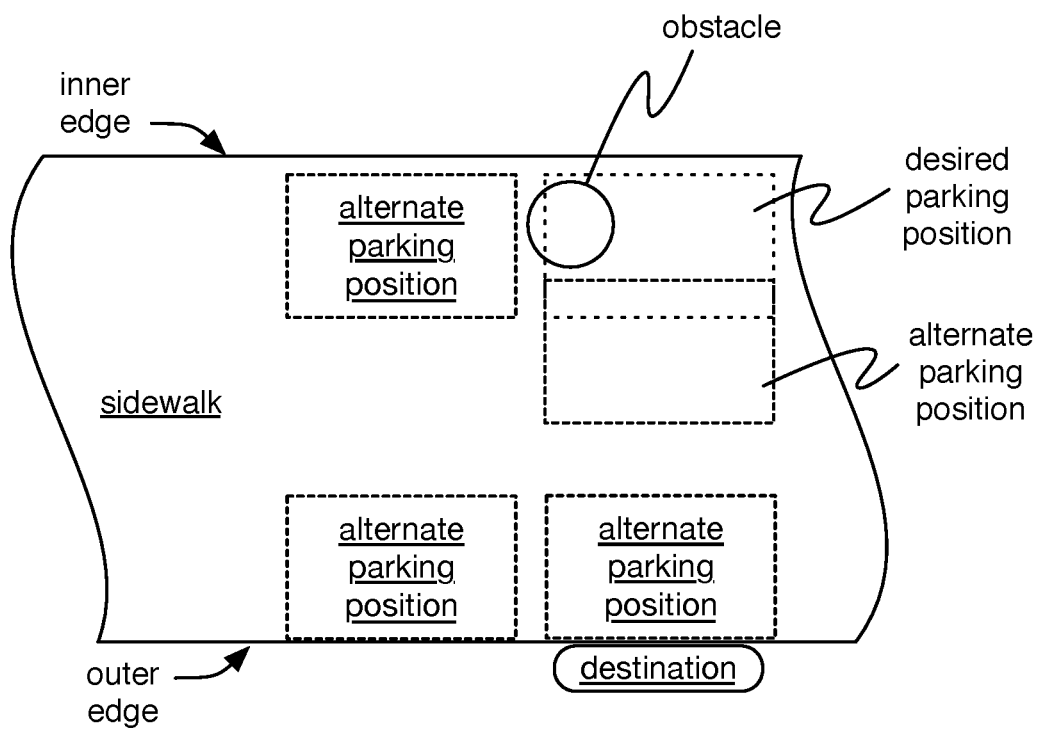
FIG. 13 is a depiction of a specific example of alternate parking position selection.

In a specific example, the parking position is determined based on the presence and/or nature of obstacles near the sidewalk outer edge (e.g., building wall abutting the sidewalk at the outer edge). In this specific example, if a building or other obstacle abuts the outer edge (e.g., sidewalk edge opposing a roadway edge or edge abutting a road), the robot parks near the outer edge, with a compartment door facing toward the roadway (e.g., as shown in FIG. 11B); whereas if the region near the outer edge is free of major obstacles, the robot parks farther from the outer edge (e.g., close to the centerline, on the centerline, distal the centerline with respect to the outer edge, near the inner edge, in the roadway, etc.; within a threshold minimum and/or maximum distance of the outer edge, centerline, and/or inner edge, such as 30, 50, 75, 100, 125, 150, 200, 250, 300, 400, 500, 10-50, 50-250, or 250-1000 cm, etc.), with the compartment door facing away from the roadway (e.g., as shown in FIG. 11A), thereby preferably enabling users to access the compartment either while on the sidewalk or while near the outer edge of the sidewalk (e.g., while standing on a lawn abutting the outer edge). The robot can optionally park and/or the parking position can optionally be selected (e.g., automatically and/or autonomously, based on control instructions received from an operator such as a remote teleoperator, etc.) further away from the destination along the desired edge (e.g., inner edge, outer edge) when an obstacle is present in the desired parking location; park in front of the obstacle, proximal the alternate edge (e.g., inner edge if the outer edge is desired, outer edge if the inner edge is desired) when an obstacle is present in the desired parking location; park along the inner edge facing the outer edge when an obstacle is present; or otherwise respond to obstacle presence in the target parking region(s) (e.g., as shown in FIG. 13). However, the robot can additionally or alternatively pause navigation in any other suitable parking position(s).

In a specific implementation, S100 includes traversing along a side (e.g., right-hand side) of a sidewalk, and assuming a stationary position in front of a user's residence (e.g., the location of which is determined based on combining the user's address, received from a remote database, with the GPS coordinates of the robot using onboard mapping system) with the compartment door arranged toward the center of the sidewalk (e.g., directed toward a vehicular roadway parallel to the sidewalk). In this specific implementation, the location of the user's residence can be determined by a combination of one or more of: image recognition (e.g., of features such as the façade of a user's home, address numerals and/or other signage, landmarks, nearby buildings, etc.; of point cloud features that match features within a predetermined point cloud map; etc.), analysis of the coordinates provided by a GPS module of the robot, querying a database that includes details pertaining to the user's residence (e.g., an image of the façade, GPS coordinates, address numerals, etc.).

4.2 Block S200

The method preferably includes Block S200, which recites: authenticating the user at the location. Block S200 functions to confirm that the user is authorized to access the compartment of the robot (e.g., the robot contains goods belonging to the user). Block S200 can include: communicating the robot identity to the user S210, receiving the user identity from the user S220, and/or verifying that the user identity and robot identity correspond S230. Block S200 is preferably performed at the robot using one or more inputs and a processing system of the robot, but can additionally or alternatively be performed by a remote server (e.g., by querying a remote database).

Authenticating the user is preferably performed prior to determining the user interaction, but can alternatively be performed contemporaneously with determining the user interaction (e.g., periodically re-authenticating the user during the user interaction with the compartment contents) or at any other suitable time. Authenticating the user is preferably performed after navigating the robot to the location (e.g., in response to completion of Block S100, in response to user interaction with the robot at the location, etc.). In variations, authenticating the user can additionally or alternatively be performed prior to (or partially performed prior to) the termination of navigating to the location of the user (e.g., via a two-factor authentication procedure wherein a randomly generated code is sent via text message to a mobile device of the user while the robot is en route to the user location, and the user enters the code at a keypad of the robot upon arrival of the robot at the user location, resulting in user authentication). However, authenticating the user can be otherwise performed.

Block S210 functions to enable the user to identify that the robot contains the user's goods (e.g., in an example in which multiple similar instances of the robot are within visual range of the user). Block S210 is preferably performed at one or more outputs of the robot (e.g., as described in Section 3 above), but can additionally or alternatively be performed at any suitable system components. Block S210 can, in variations, include communicating the robot identity by way of an auditory notification (e.g., the robot synthesizes or plays an audio recording stating, "Hi, I'm Tim!"), a visual notification (e.g., the robot displays a light pattern corresponding to a light pattern displayed on a mobile device of the user), a data transmission (e.g., a text message sent to the user that includes the name of the robot, wherein the robot name is displayed on the robot, such as painted on the side of the robot; a robot identifier transmitted by a Bluetooth beacon, NFC beacon, or other short- or long-range wireless communication system; etc.), encoded displayed or visual data (e.g., a QR code is displayed at a screen of the robot, and can be scanned by a mobile device of the user), or any other suitable means of communicating identifying information about the robot to the user.

Block S220 functions to provide identifying information pertaining to the user (e.g., the user identity) to the robot as part of the authentication process. Block S220 is preferably performed at one or more inputs of the robot (e.g., as described in Section 3 above), but can additionally or alternatively be performed at any suitable system components. Block S220 can, in variations, include receiving the user identity by way of voice recognition (e.g., the robot samples and/or records and analyzes the user's voice stating a user identifier, such as "Hi, I'm Timothea!"), visual recognition (e.g., a camera and processor of the robot samples and/or records and analyzes the user's facial features; the robot samples and/or records and analyzes a QR code displayed by an application executing at the user's mobile device, wherein the QR code is associated with a user identifier), a data transmission (e.g., the user scans a QR code at an application executing at the user's mobile device, which automatically transmits a message containing the user identity associated with the mobile device to the robot that generated the QR code), or any other suitable means of communicating identifying information about the user to the robot.

Block S230 functions to confirm that the robot contains goods corresponding to the user whose identity has been provided to the robot, to ensure that a transaction (e.g., delivery of goods) should be initiated with that user. In a first variation, Block S230 is performed automatically by the robot in communication with a remote database (e.g., a facial recognition system of the robot extracts facial features of the user, and queries a remote database to compare the extracted facial features with a set of user profiles containing the facial features of various users, thereby identifying and thus authenticating the user whose facial features correspond to the extracted facial features; the user enters an alphanumeric code at a keypad of the robot, and the robot queries a remote database to compare the entered code with a set of allowable codes; etc.). In a second variation, Block S230 is performed by a teleoperator in communication with the robot (e.g., a camera feed from the robot is displayed to a remote teleoperator, and the teleoperator identifies the user based on manually comparing the displayed image of the user to a user profile that includes an image of the user). In a third variation, Block 230 is performed locally at the robot without communicating with a remote database (e.g., the user enters an alphanumeric code at a keypad of the robot, and the robot checks the entered code against an internal registry of allowable codes). However, Block S230 can additionally or alternatively be performed in any suitable manner and using any other suitable system components. Block S230 is preferably based on the user identity received in Block S220 and the robot identity corresponding to the robot performing Block S230, but can alternatively have any other suitable basis.

4.3 Block S300

Figure 7:
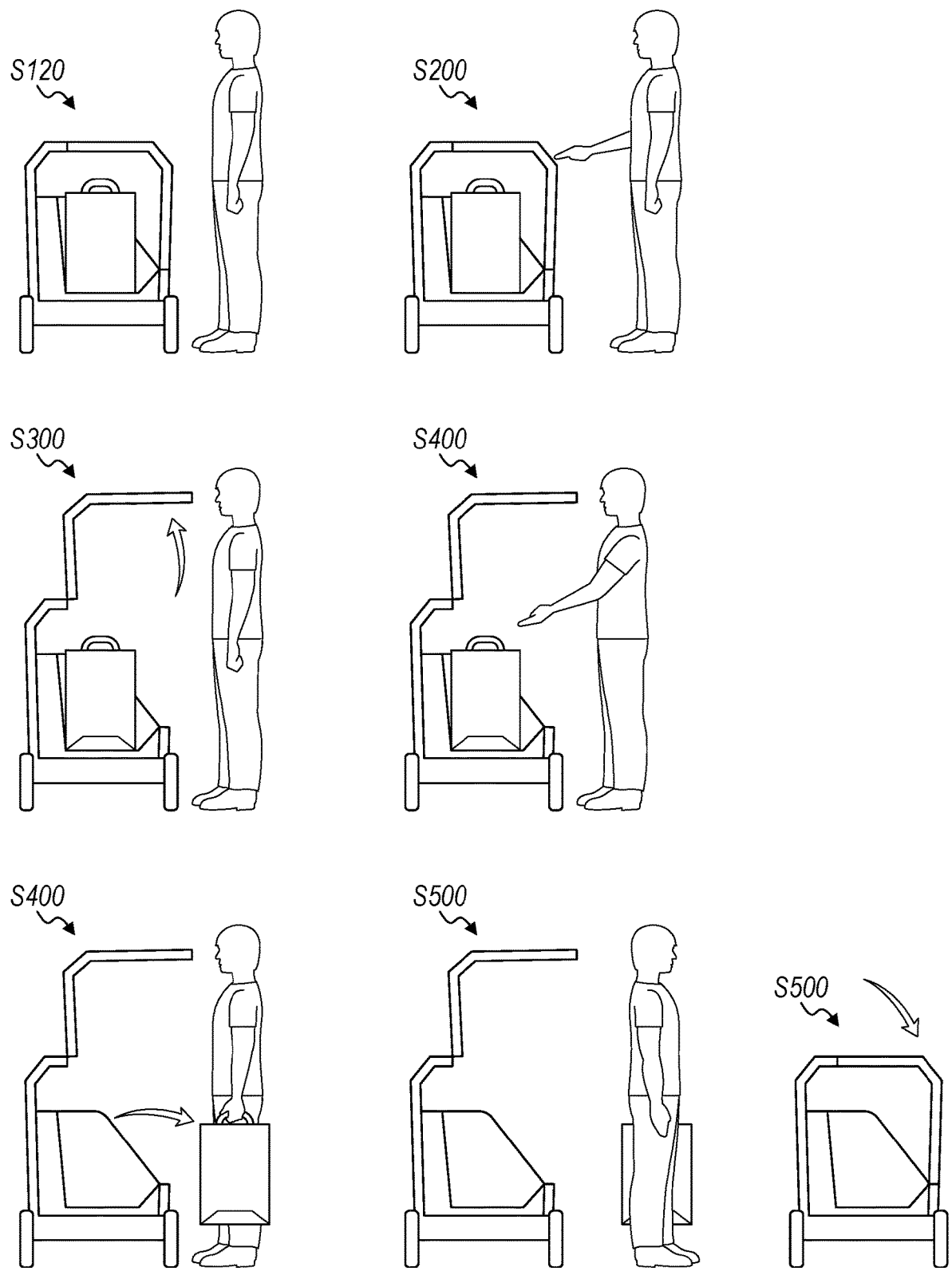
FIG. 7 is a depiction of a variation of a portion of the method.
Figure 8:
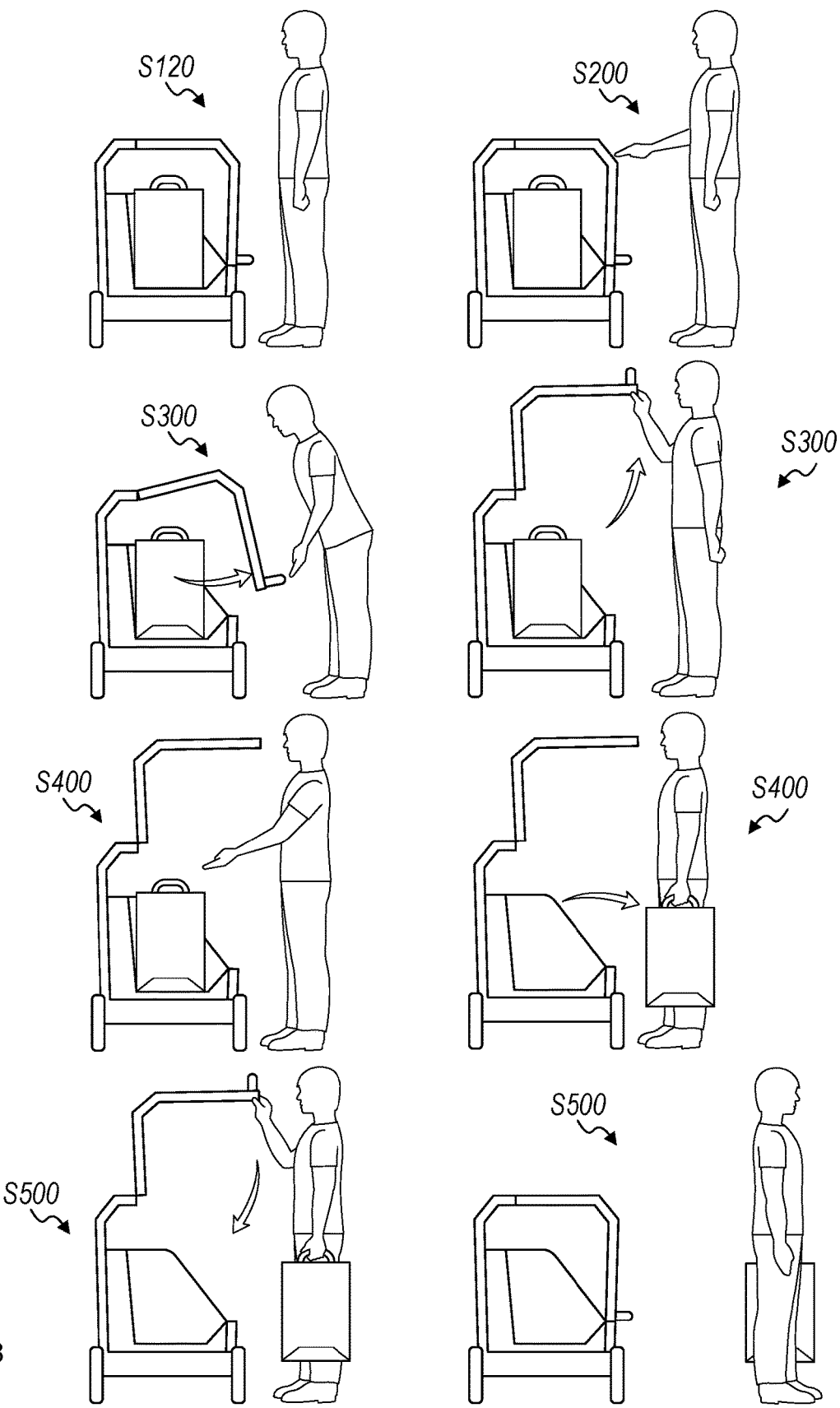
FIG. 8 is a depiction of a variation of a portion of the method.

The method preferably includes Block S300, which recites: initiating a transaction with the user. Block S300 functions to communicate to the user that authentication was successful and that the exchange of goods between the user and the robot compartment can proceed. Block S300 can additionally function to provide the user with access to the compartment. Block S300 is preferably performed in response to authenticating the user, but can additionally or alternatively be performed: without first authenticating the user, concurrent with user authentication (e.g., during the authentication process), and/or at any other suitable time. Block S300 can include unlocking and/or opening the compartment door. In a first variation (e.g., in which the robot includes a powered mechanism that can be controlled to open the door), Block S300 includes completely opening the door (e.g., the door fully opens in an automated fashion upon authentication of the user), such as shown in FIG. 7. In a second variation (e.g., in which the robot door includes a mechanical opening mechanism, such as a spring, configured to partially open the door in response to door unlocking and/or unlatching), Block S300 includes partially opening the door of the compartment (e.g., in response to authenticating the user, the compartment door is unlocked and partially opened, indicating to the user that authentication was successful and allowing the user to fully open the door at a time point of the user's choosing), such as shown in FIG. 8. In a third variation, Block S300 includes unlocking the door (e.g., thereby enabling the user to unlatch and/or open the door after it is unlocked) but not opening the door.

Block S300 can additionally or alternatively include notifying the user, which functions to alert the user that a transaction has been or is being initiated. In a first variation, notifying the user includes generating and providing an audio notification (e.g., emitting a tone pattern, synthesizing a verbal message, playing a recording, etc.) to the user. In a second variation, notifying the user includes generating and providing a visual notification (e.g., displaying a lighting pattern, performing an oscillatory dancing motion using a drive module of the robot, etc.) to the user. However, notifying the user can additionally or alternatively include generating and providing any suitable notification.

In a specific implementation, Block S300 includes unlocking the compartment and emitting a green glow at a lighting module arranged proximal a handle of the robot compartment. In this specific implementation, Block S300 can optionally include slightly opening the door (e.g., displacing the door approximately 1 cm from the closed and locked configuration; releasing a door latch, thereby causing door motion; etc.) to indicate to the user that the door is unlocked and ready to open. In a related specific implementation, Block S300 can include indicating that the user can remove his or her goods from the compartment by repeating his or her name aloud, along with a message that the authentication was successful and that the goods can be retrieved by the user (e.g., the robot provides a natural language audio indication that states "Thanks, Dave, you can remove your groceries now!"). However, Block S300 can have any other suitable implementation.

4.4 Block S400

The method preferably includes Block S400, which recites: determining a user interaction with the contents of the compartment of the robot. Block S400 preferably functions to monitor and/or facilitate the transfer of the user's goods between the compartment of the robot and the user. Block S400 can function to ensure that the user has removed all of his or her goods from the compartment, and/or that the user has not removed another user's goods from the compartment. Block S400 is preferably performed using the compartment sensor of the robot (e.g., determining that goods have been removed by a user from a subcompartment using a weight sensor detecting the presence of goods in the subcompartment), but can additionally or alternatively be performed using any suitable inputs of the robot or any other suitable system components.

Block S400 can include detecting the addition (and/or removal) of goods to (and/or from) the compartment, verifying that the added and/or removed goods correspond to the user, indicating the goods retained by the compartment that correspond to the user, generating an alert and providing the alert to the user, determining a waiting event, and/or receiving a user input. However, Block S400 can additionally or alternatively include any other suitable processes and/or subprocesses.

Detecting the addition of goods to the compartment and/or the removal of goods from the compartment by a user functions to enable tracking of the contents of the compartment of the robot, and can also function to provide feedback to the user based on the detected addition and/or removal of goods. In a first variation of Block S400, a ToF sensor of each compartment detects that goods have been removed from a subcompartment (e.g., a first subcompartment). However, Block S400 can be performed by any suitable sensor or combination thereof.

Verifying that the added and/or removed goods correspond to the user functions to determine that the correct goods have been added or removed by the user. In the first variation of Block S400, the robot queries a database (e.g., database including information associated with the goods, such as the anticipated weight, anticipated shape, robot and/or subcompartment into which the goods were loaded, etc.) and associates the authenticated user with goods that are retained in a subcompartment of the compartment, based on the database query (e.g., the measured weight matches the anticipated weight within a threshold error, the measured shape matches the anticipated shape within a threshold error, the current subcompartment is the subcompartment into which the goods associated with the user were loaded, etc.). At the robot control module, the robot then associates the subcompartment in which the user's goods are retained with the subcompartment from which the robot detected removal of goods, in order to verify that the user's goods were the removed goods. However, the addition and/or removal of goods corresponding to the user can be otherwise suitable verified.

Indicating the goods corresponding to the user (e.g., in response to verifying that the goods correspond to the user) functions to aid the user in selecting and removing the goods that belong to him or her from the robot compartment. In the first variation of Block S400, indicating the goods includes illuminating the subcompartment(s) in which the user's goods are retained, while maintaining other subcompartments in a substantially non-illuminated state, in order to guide the user to the correct subcompartment (e.g., the subcompartment(s) containing their goods). In a second variation, indicating the goods includes providing (e.g., displaying, speaking, etc.) an identifier associated with the subcompartment(s) in which the user's goods are retained (e.g., displaying the number 3 at an electronic display within the robot, generating a spoken alert saying "Please take the bags from subcompartments 2 and 3", etc.). However, the goods corresponding to the user can be otherwise suitably indicated.

Determining that the user removed goods that do not correspond to the user (e.g., the incorrect goods) functions to provide a basis for alerting the user that they have not removed the correct goods from the compartment of the robot. In the first variation of Block S400, if the user removes goods from a subcompartment that is not illuminated and/or the robot detects the removal of goods from a subcompartment that does not correspond to the authenticated user, the robot can thereby determine that the user removed the incorrect goods. In another variation, a teleoperator viewing the transaction on a display receiving a video feed of the compartment interior manually determines that the user has removed the incorrect goods. However, whether the user has removed goods that do not correspond to the user can be otherwise suitably determined.

Generating and providing an alert to the user functions to provide feedback to the user, and can also function to inform the user of their success or failure in removing the correct goods from the robot compartment. In a first variation, generating and providing an alert includes alerting the user that they have removed an incorrect item (e.g., an audio message stating "whoops, you took the wrong bag!" and/or another audio signal associated with incorrect item removal is played). In a second variation, generating and providing an alert includes alerting the user that they have removed the correct item, and that additional goods corresponding to the user remain in the robot (e.g., an ongoing-transaction alert). In a third variation, generating and providing an alert includes alerting the user that they have removed all the goods corresponding to the user from the robot compartment (e.g., interior illumination of the robot compartment is switched off and a predetermined tone pattern is emitted). However, generating and providing an alert to the user can be otherwise suitably performed.

Determining a waiting event functions to analyze the user interaction and recognize that the user interaction is ongoing, and that the robot should not conclude the interaction and/or attempt to depart. A waiting event can include the user's goods remaining in the compartment, the user continuing the interaction with the robot, or any other suitable events that suggest the robot should wait at the location of the user. In a first variation, determining a waiting event includes determining that the user's goods are not the goods that have been detected as added to or removed from the robot compartment. In a second variation, determining a waiting event includes determining that the user has given instructions to the robot for the robot to wait (e.g., via a natural language processing analysis of a recording of the user's voice at a microphone of the robot, absence of termination event, etc.).

In a third variation, determining a waiting event includes determining that only a subset (or none) of the user's goods have been removed from the robot compartment (and that other goods of the user remain within the robot compartment). For example, if the user's goods are (e.g., before Block S300) contained within multiple containers (e.g., bags) within the robot compartment (e.g., each container in a separate robot subcompartment, some or all containers sharing a subcompartment, etc.), a waiting event can be determined in response to some but not all of the containers have been removed from the compartment. In a specific example, the user's goods are contained within three bags, two of which are removed from the compartment (e.g., within a first threshold time, such as 5 s, 10 s, 15 s, 30 s, 60 s, 1-20 s, 20-60 s, etc.) while the third remains within the compartment (e.g., for a second threshold time, such as 5 s, 10 s, 15 s, 30 s, 60 s, 1-20 s, 20-60 s, etc., following a user activity such as removal of another bag, interaction with the robot door and/or inputs, etc.). In this specific example, the waiting event can be determined in response to determining that the third bag remains (e.g., after the first and/or second threshold time elapse). In another example of this variation, a waiting event can be determined (e.g., immediately) in response to a user action (e.g., interaction with the robot and/or an associated application, such as an application executing on a user device of the user) while some or all of the user's goods remain within the compartment. Such user actions can include, in specific examples: the user closing and/or latching the door, the user providing a "finish interaction" or "wait" input at the robot and/or application, the user moving (e.g., walking) away from the robot, and/or any other suitable actions. However, determining a waiting event can additionally or alternatively include any suitable determination of a waiting event.

Determining a waiting event can additionally include notifying the user that the robot will wait, which functions to communicate to the user that the robot has determined a waiting event and intends to wait. In one variation, notifying the user that the robot will wait includes emitting a light pattern indicative of a restful state (e.g., a soft, pulsating glow emitted at an LED strip of the robot), such as in response to receipt of a user stating "wait" while proximal the robot (e.g., within range of a microphone of the robot). In another variation, the robot can emit faint snoring sounds to communicate non-verbally that it is in a waiting state. In another variation, the robot can state (e.g., provide an audio output corresponding to spoken words) "I'll wait here for you" and/or "Come back when you're ready. There's more stuff in here for you!" However, notifying the user that the robot will wait can be otherwise suitably performed.

In response to determining the waiting event, the robot preferably waits (e.g., operates in a waiting mode, does not traverse toward a subsequent waypoint, etc.) for the user to resume interactions (e.g., following the user's return). In some variations, the robot compartment remains accessible (e.g., open and/or unlocked door) while waiting. In alternate variations, the robot compartment is secured (e.g., door closed and/or locked) while waiting. These variations can optionally include re-authenticating the user (e.g., as described above regarding Block S200, such as using the same and/or different authentication method as was used to initially authenticate the user) to allow the user to regain access to the compartment following operation in the waiting mode. However, waiting mode operation can additionally or alternatively be performed in any other suitable manner.

Receiving user input functions to enable the user to contribute input and/or instructions in the context of the user interaction determined in Block S400. Receiving user input is preferably performed by one or more inputs of the robot (e.g., microphones, cameras, etc.), such as discussed above in Section 3, but can additionally or alternatively be performed by any suitable system component. User input can include instructions (e.g., directing the robot to wait by pressing a button on the robot), complaints (e.g., stating "My groceries aren't in here" into a microphone of the robot), compliments (e.g., nodding approvingly within the viewable area of a camera of the robot, stating "This worked really well"), and/or any other suitable user inputs. However, user input can be otherwise suitably received.

4.5 Block S500

The method preferably includes Block S500, which recites: determining a termination event. Block S500 functions to inform the robot and/or an operator of the robot that the transaction with the user has reached its conclusion. Block S500 can include, in variations, determining that all contents associated with the authenticated user have been removed from the compartment, that a timeout condition has been reached (e.g., a time interval such as 5 s, 10 s, 15 s, 30 s, 60 s, 1-20 s, 20-60 s, etc., has elapsed since the most recent user interaction with the robot), that a user input has been received (e.g., the user has closed or applied a closure force to the compartment door), that an ambient environmental condition has been met (e.g., recording and analyzing the sound of a police siren, and determining that the robot should enter a lockdown state and close and lock the compartment), that an override instruction has been received (e.g., a teleoperator transmits instructions to cancel and end the transaction immediately), that a standard termination instruction has been received (e.g., a teleoperator transmits a communication indicating that the transaction has completed successfully), and/or determining any other suitable termination event. Block S500 can additionally or alternatively include generating a notification in response to determining the termination event (e.g., generating an audio and/or visual response and moving away from the user), updating a remote database in response to determining the termination event (e.g., logging that a delivery process and/or transaction has been completed or aborted), automatically closing and/or locking the compartment (e.g., until a subsequent verified user is detected, such as at the same location or, after robot traversal to a second location, at the second location), or any other suitable response to determining the termination event. In a first specific example (e.g., in which the robot includes a powered mechanism that can be controlled to close the door), Block S500 includes, in response to determining the termination event: ensuring that conditions are safe for closing the door (e.g., ensuring that no obstacles will impede door closing, using the compartment occupancy sensors, a deadman's switch, and/or another sensor set), controlling the door to close, determining that the door has closed, and then locking the door in response. In a second specific example (e.g., in which the robot door does not include a powered closing mechanism), Block S500 includes: determining that the door has been closed (and/or that other termination event conditions have been satisfied), and then locking the door in response, and can optionally include requesting that the user close the door (e.g., via a robot output, such as a spoken and/or visual request; via a client of a user electronic device, such as a mobile phone app; etc.). However, a termination event can be otherwise suitably determined.

4.6 Block S600

The method can optionally include Block S600, which recites: resuming navigating, preferably upon determining the termination event. Block S600 functions to transport the robot to a different location, after the delivery process at the first location (e.g., the location of the user) is completed (e.g., after the termination event is determined). For example, Block S600 can include navigating to a location corresponding to a user whose goods remain in the compartment (e.g., in a case in which a single delivery robot is delivering the goods corresponding to multiple users residing at multiple locations). In another example, Block S600 can include navigating to a goods-origination point (e.g., a grocery store; a warehouse; a deliveries staging area; a delivery vehicle, such as a road-going vehicle, an aircraft, and/or a watercraft; etc.) to acquire goods for subsequent delivery. In another example, determining the termination event can include determining that the user is not at the location, and Block S600 can thus include navigating to another location to deliver goods to a second user, and then returning to the first location to resume the delivery process with the first user after determining a determination event during the delivery process with the second user. However, Block S600 can include any other suitable resumption of navigation.

4.7 Block S700

The method can optionally include Block S700, which recites: receiving and executing control instructions at the robot. Block S700 functions to dynamically adjust the behavior of the robot in response to received instructions. In a first variation, Block S700 includes receiving teleoperation instructions from a remote teleoperator, and executing the teleoperation instructions at the robot (e.g., receiving instructions to unlock and open the compartment, and unlocking and opening the compartment in response). In a second variation, Block S700 can include receiving emergency override instructions from a pedestrian bystander, such as by way of an emergency input (e.g., shutoff input, such as a switch) arranged at an external surface of the robot, and entering an emergency shutoff state in response. In a third variation, Block S700 automatically determines and executes operation instructions (e.g., based on on-board and/or remote sensor outputs) However, Block S700 can additionally or alternatively include receiving and executing any suitable control instructions.

4.8 Specific Examples

Figure 9:
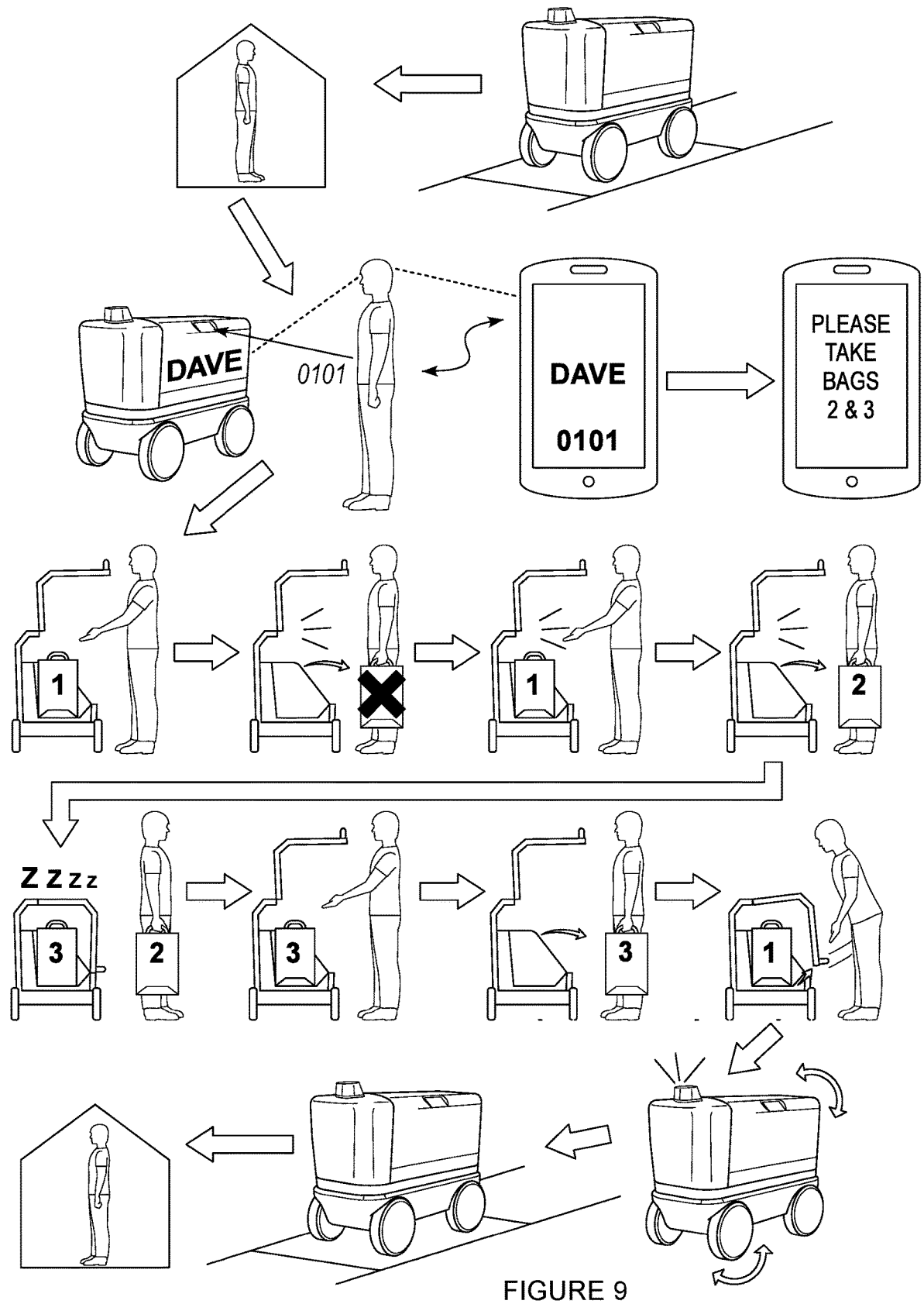
FIG. 9 is a depiction of a specific example implementation of the method.

As shown in FIG. 9, an example implementation of the method for delivery robot operation includes driving to a waypoint where a user is located (e.g., the user's workplace). The example implementation includes communicating the identity of the robot to the user via a nameplate affixed to the exterior of the robot that is illuminated by a flashing light module of the robot. The robot verifies the identity of the user by analyzing a code entered by the user at a keypad of the robot arranged proximal a handle of the robot's compartment door, and comparing the code to a code associated with the user (e.g., received via a remote database query, received along with the instructions to drive to the waypoint, etc.). Upon verifying the identity of the user, the robot unlocks and fully opens the compartment. The user removes the incorrect grocery bag from a subcompartment, as detected by a ToF sensor that detects the binary presence or non-presence of goods in the subcompartment, and the robot generates and provides an auditory message in response that states, "Whoops! You took the wrong item!" The user replaces the incorrect grocery bag into the subcompartment, as detected by the ToF sensor (or, into a second subcompartment, such as detected by a second ToF sensor, wherein the changed location of the incorrect grocery bag from the first to the second subcompartment is stored for use in association with later delivery of the incorrect grocery bag to its intended recipient), and the robot compliments the user in response and states "Thanks, now try again!" The user removes his first grocery bag from the correct subcompartment, and the robot compliments the user and enters a waiting state. The user removes his second grocery bag from another correct subcompartment, and the robot determines that the delivery process has completed and receives a confirmatory input from the user at the keypad (e.g., a depression of a button marked "done") indicating that the delivery process has terminated. In response, the robot closes and locks the compartment, executes a celebratory dancing motion and emits a celebratory audio tone, and navigates to a second location.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for delivery robot operation comprising, at a delivery robot comprising a compartment defining a lumen, the lumen defining a first subcompartment and a second subcompartment:
   receiving an instruction to deliver a first set of goods to a user;
   in response to receiving the instruction, navigating the delivery robot to a location associated with the user, the location comprising a walkway, the walkway defining a centerline arranged equidistant between an inner edge and an outer edge of the walkway, wherein, while navigating the delivery robot to the location:
      the first subcompartment contains the first set of goods; and
      the second subcompartment contains a second set of goods;
   in response to receiving the instruction, authenticating the user;
   determining a parking position on the walkway and an orientation of the compartment when the delivery robot is parked based on presence and/or nature of one or more obstacles adjacent to one of the inner edge or the outer edge of the walkway;
   at the location, with the delivery robot parked at the determined parking position and the compartment at said orientation, in response to authenticating the user, unlocking a door of the compartment, thereby enabling user access to the lumen and inside each of the first subcompartment and the second subcompartment at a same time;
   after unlocking the door, using a first time of flight (ToF) sensor of the compartment, sampling a measurement indicative of removal of the first set of goods from the first subcompartment;
   after unlocking the door and before locking the door, using a second ToF sensor of the compartment, sampling a second measurement indicative of removal of the second set of goods from the second subcompartment;
   after sampling the measurement, determining that the door is closed and thus blocking the user access to the lumen and inside each of the first subcompartment and the second subcompartment; and
   in response to sampling the measurement and determining that the door is closed, locking the door, thereby disabling the user access to the lumen and inside each of the first subcompartment and the second subcompartment.

2. The method of claim 1, further comprising:
   at the delivery robot, in response to sampling the second measurement, providing an alarm output to the user, the alarm output indicative of incorrect goods removal.

3. The method of claim 2, further comprising, after providing the alarm output:
   using the second ToF sensor, sampling a third measurement indicative of replacement of the second set of goods into the second subcompartment; and
   at the delivery robot, in response to sampling the third measurement, providing an acknowledgment output to the user;
   wherein locking the door is performed in further response to sampling the third measurement.

4. The method of claim 1, further comprising, at the delivery robot:
   receiving a second instruction to deliver the second set of goods to a second user;
   in response to receiving the second instruction, after locking the door, while the second subcompartment contains the second set of goods, authenticating the second user;
   in response to authenticating the second user, unlocking the door, thereby enabling the user access to the lumen and inside each of the first subcompartment and the second subcompartment at the same time; and
   at the delivery robot, in response to receiving the second instruction, after determining that the door is closed, navigating the delivery robot to a second location associated with the second user.

5. The method of claim 4, wherein:
   authenticating the user comprises:
      at an input of the delivery robot, receiving a first code from the user; and
      determining that the first code is equivalent to a first stored code associated with the user; and
   authenticating the second user comprises:
      at the input, receiving a second code from the second user; and
      determining that the second code is equivalent to a second stored code associated with the second user, wherein the second stored code is not equivalent to the first stored code.

6. The method of claim 5, further comprising:
   before authenticating the user, providing the first code to the user via a first client of a first electronic user device; and
   before authenticating the second user, providing the second code to the second user via a second client of a second electronic user device.

7. The method of claim 1, further comprising:
   providing a robot identifier to the user via a client of an electronic user device; and
   at the delivery robot, after navigating the delivery robot to the location and before sampling the measurement, providing an identifier output to the user, wherein the identifier output is indicative of the robot identifier.

8. The method of claim 1, the further comprising, after unlocking the door and before sampling the measurement:

controlling a first light source of the delivery robot to illuminate the first set of goods, wherein the first light source is oriented substantially toward the first set of goods; and controlling a second light source of the delivery robot to not illuminate the second set of goods, wherein the second light source is oriented substantially toward the second set of goods.

9. The method of claim 1, wherein the lumen further defines a third subcompartment and, while navigating the delivery robot to the location, the third subcompartment contains a third set of goods; the method further comprising, at the delivery robot:

before navigating the delivery robot to the location, receiving a second instruction to deliver the third set of goods to the user;

in response to sampling the measurement, determining a wait event;

in response to determining the wait event, operating the delivery robot in a waiting mode, comprising providing a waiting indication to the user; and before determining that the door is closed, while operating the delivery robot in the waiting mode, using a second ToF sensor of the compartment, sampling a second measurement indicative of removal of the third set of goods from the third subcompartment;

wherein locking the door is performed in further response to sampling the second measurement.

10. The method of claim 1, further comprising, at the delivery robot:

in response to unlocking the door and before sampling the measurement, controlling the door to open and thus providing the user access to the lumen and inside each of the first subcompartment and the second subcompartment at the same time; and in response to sampling the measurement and before determining that the door is closed, controlling the door to close, thereby blocking the user access to the lumen and inside each of the first subcompartment and the second subcompartment.

11. The method of claim 1, wherein:

the walkway comprises a sidewalk, the sidewalk comprising the inner edge arranged proximal a roadway and the outer edge arranged distal the roadway, the sidewalk defining the centerline arranged equidistant between the inner edge and the outer edge, the parking position being arranged between the centerline and the outer edge; and said navigating the delivery robot to the location comprises stopping the robot at the parking position.

12. The method of claim 11, wherein, while stopped at the parking position, the door is arranged proximal the outer edge.

13. A method for delivery robot operation comprising, at a delivery robot comprising a compartment defining a lumen, the lumen defining a first subcompartment and a second subcompartment:

receiving an instruction to deliver a first set of goods and a second set of goods to a first user;

in response to receiving the instruction, navigating the delivery robot to a location associated with the user, wherein, while navigating the delivery robot to the location:

the first subcompartment contains the first set of goods;
the second subcompartment contains second set of goods; and a third subcompartment contains a third set of goods not for the first user;

in response to receiving the instruction, authenticating the user;

at the location, in response to authenticating the user, unlocking a door of the compartment, thereby enabling user access to the lumen and inside each of the first subcompartment, the second subcompartment, and the third subcompartment at a same time;

after unlocking the door, sampling a first measurement indicative of removal of the first set of goods from the first subcompartment;

after sampling the first measurement, determining a wait event;

in response to determining the wait event, operating the delivery robot in a waiting mode, comprising providing a waiting indication to the user;

after providing the waiting indication, sampling a second measurement indicative of removal of the second set of goods from the second subcompartment;

after providing the waiting indication and before locking the door sampling a third measurement indicative of removal of the third set of goods from the third subcompartment;

after sampling the second measurement and the third measurement, determining that the door is closed and thus blocking the user access to the lumen and inside each of the first subcompartment, the second subcompartment, and the third subcompartment;

in response to determining that the door is closed, locking the door, thereby disabling the user access to the lumen and inside each of the first subcompartment, the second subcompartment, and the third subcompartment;

the location comprises a sidewalk, the sidewalk comprising an inner edge arranged proximal a roadway and an outer edge arranged distal the roadway, the sidewalk defining a centerline arranged equidistant between the inner edge and the outer edge;

the method further comprises determining a parking position on the sidewalk, wherein the parking position is arranged between the centerline and the outer edge; and said navigating the delivery robot to the location comprises stopping the robot at the parking position.

14. The method of claim 13, further comprising, at the delivery robot:

after sampling the first measurement and before operating the delivery robot in the waiting mode, determining that the door is closed and thus blocking the user access to the lumen and inside each of the first subcompartment, the second subcompartment, and the third subcompartment;

in response to determining that the door is closed and determining the wait event, locking the door, thereby disabling the user access to the lumen and inside each of the first subcompartment, the second sub compartment, and the third subcompartment, wherein the door is locked while operating the delivery robot in the waiting mode; and after providing the waiting indication and before sampling the second measurement:

re-authenticating the user; and in response to re-authenticating the user, unlocking the door, thereby enabling user access to the lumen and inside each of the first subcompartment, the second subcompartment, and the third subcompartment at the same time.

15. The method of claim 13, wherein determining the wait event comprises determining that a threshold period of time has elapsed since sampling the first measurement.

16. The method of claim 13, further comprising, at the delivery robot:
- before navigating the delivery robot to the location, receiving a second instruction to deliver a third set of goods to the user; and
- sampling a third measurement indicative of removal of the third set of goods from a third subcompartment defined by the lumen;

wherein:
- while navigating the delivery robot to the location, the third subcompartment contains the third set of goods; and
- the wait event is determined in response to sampling the first measurement and the third measurement.

17. The method of claim 13, wherein determining the wait event comprises receiving a wait input from the user at an input of the delivery robot.

18. The method of claim 13, wherein determining the wait event comprises determining that the user has moved away from the delivery robot.

19. The method of claim 13, further comprising, at the delivery robot:
- after unlocking the door and before sampling the first measurement:
  - controlling a first light source of the delivery robot to illuminate the first subcompartment, wherein the first light source is oriented substantially toward the first set of goods; and
  - controlling a second light source of the delivery robot to illuminate the second subcompartment, wherein the second light source is oriented substantially toward the second set of goods;
- in response to sampling the first measurement, controlling the first light source to not illuminate the first subcompartment; and
- after sampling the first measurement and before sampling the second measurement, controlling the second light source to illuminate the second subcompartment.

20. A method for delivery robot operation comprising, at a delivery robot comprising a compartment defining a lumen, the lumen defining a first subcompartment and a second subcompartment:
- receiving an instruction to deliver a first set of goods to a user;
- in response to receiving the instruction, navigating the delivery robot to a location associated with the user, wherein, while navigating the delivery robot to the location:
- the first subcompartment contains the first set of goods; and
- the second subcompartment contains a second set of goods;
- in response to receiving the instruction, authenticating the user;
- at the location, in response to said authenticating the user, unlocking a door of the compartment, thereby enabling user access to the lumen;
- after unlocking the door, at a first time of flight (ToF) sensor of the compartment, sampling a measurement indicative of removal of the first set of goods from the first subcompartment;
- after sampling the measurement, determining that the door is closed; and
- in response to sampling the measurement and determining that the door is closed, locking the door, wherein:
- the location comprises a sidewalk, the sidewalk comprising an inner edge arranged proximal a roadway and an outer edge arranged distal the roadway, the sidewalk defining a centerline arranged equidistant between the inner edge and the outer edge;
- the method further comprises determining a parking position on the sidewalk, wherein the parking position is arranged between the centerline and the outer edge; and
- navigating the delivery robot to the location comprises stopping the robot at the parking position.

* * * * *